May 15, 1962     G. H. PRIMEAU     3,034,810
BALL-JOINT ASSEMBLY FOR CASTER AND CAMBER ADJUSTMENT
Filed Nov. 3, 1958
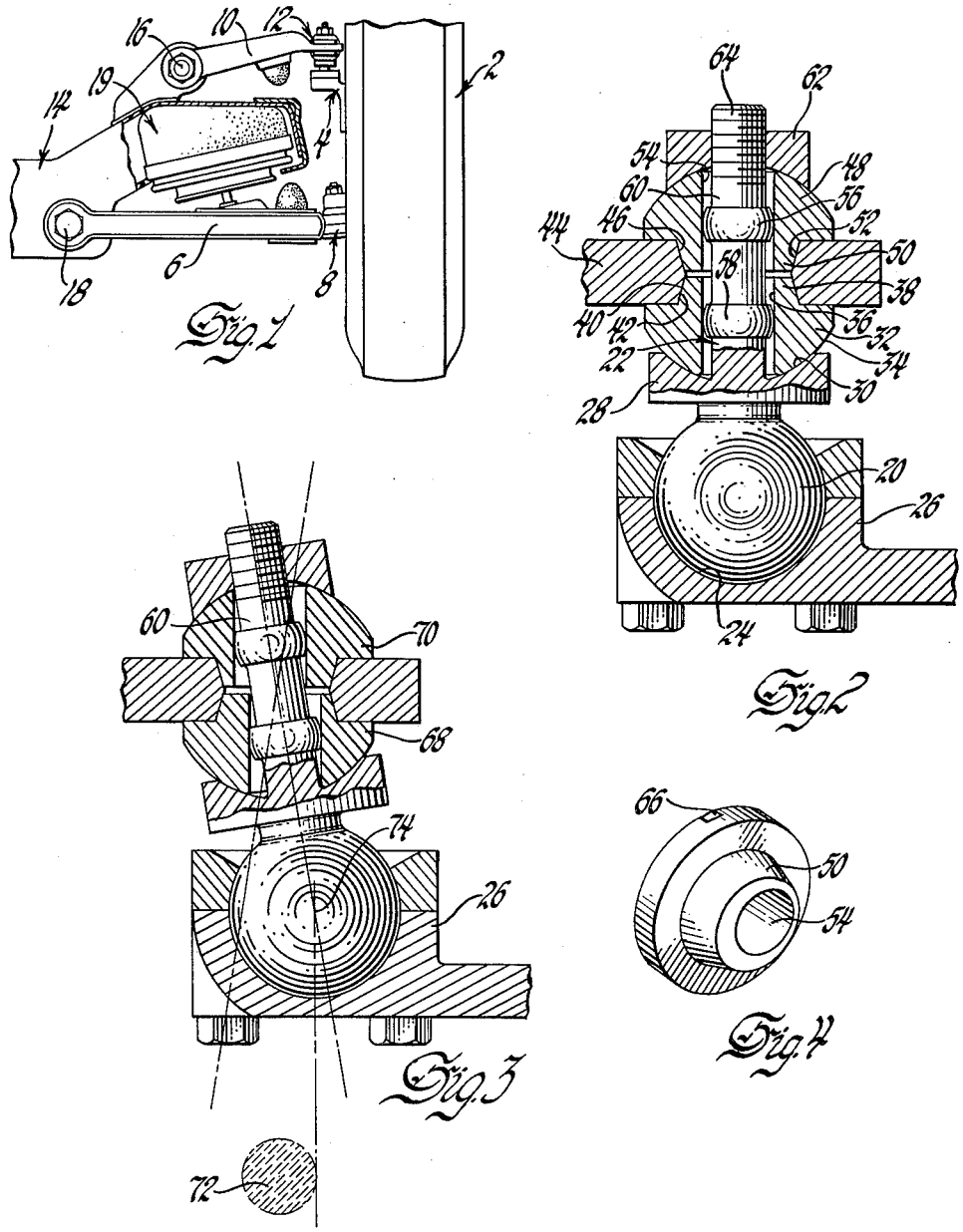
INVENTOR.
George H. Primeau
BY
W. F. Wagner
ATTORNEY United States Patent Office 3,034,810
Patented May 15, 1962

3,034,810
BALL JOINT ASSEMBLY FOR CASTER AND
CAMBER ADJUSTMENT
George H. Primeau, Grosse Pointe Farms, Mich., assignor to General Motors Corporation, Detroit, Mich., a corporation of Delaware
Filed Nov. 3, 1958, Ser. No. 771,644
2 Claims. (Cl. 287—14)

This invention relates to ball joint assemblies and more particularly, although not exclusively, to ball joint assemblies which include means for adjusting caster and camber of the dirigible wheels of a vehicle.

In the prior art it has been proposed to provide ball joint assemblies in which the ball stud is formed on an axis offset with respect to the geometric center of the ball, whereby rotation of the stud in its support causes the center of the ball to shift both laterally and longitudinally to provide a limited degree of caster and camber adjustment. While such devices are superior to conventional fixedly mounted ball joint assemblies, the degree of selection in adjustment afforded thereby is severely limited owing to the fact that the choice of positions of the geometric center of the ball is limited to points coinciding with the circular path described by the offset of the center of the ball relative to the axis of rotation of the stud. Such arrangements also have an additional disadvantage in that any adjustment calculated to achieve a desired camber also simultaneously alters the caster adjustment, to some extent, and vice versa.

An object of the present invention is to provide an improved ball joint assembly.

Another object is to provide in a wheel suspension, a ball joint assembly which affords extended scope of caster and camber adjustment.

A further object is to provide an eccentric mounting for a ball joint assembly which is capable of adjustment so as to position the geometric center of the ball at any desired point within a predetermined circular area.

Yet a further object is to provide a structure of the stated character which is simple in construction, low in cost, and efficient in operation.

These and other objects, advantages, and features of the invention will become more clearly apparent as reference is had to the accompanying specification and drawings wherein:

FIG. 1 is a fragmentary front elevational view of a dirigible wheel suspension assembly incorporating the present invention;

FIG. 2 is an enlarged fragmentary view, partly in section, and with parts broken away, illustrating the form and construction of an adjustable ball joint assembly according to the invention;

FIG. 3 is a view similar to FIG. 2 showing the assembly in one extreme of adjustment; and FIG. 4 is a perspective view of one of the two eccentric elements utilized in the invention.

Referring now to FIG. 1 of the drawings, there is shown a portion of a vehicle front wheel suspension assembly wherein the reference numeral 2 designates the dirigible wheel. Wheel 2 is rotatably mounted on a wheel spindle, not shown, which includes a vertically extending steering knuckle assembly 4. The lower end of knuckle 4 is pivotally connected to a transversely extending lower control arm 6 by a ball joint assembly 8, while the upper end of knuckle 4 is connected to the outer end of a transversely extending upper control arm 10 by means of an adjustable ball joint assembly 12. Lower and upper control arms 6 and 10, respectively, are pivotally connected at their inboard ends to cross member 14 by means of conventional pivotal connections 16 and 18. Near its outer end cross member 14 has disposed therein an elastic support which in the illustrated embodiment takes the form of an air spring assembly 19. Assembly 19 is arranged to react with lower control arm 6 so as to support the sprung mass of the vehicle with respect to wheel 2.

In accordance with the present invention, ball joint assembly 12 is constructed and arranged as to permit of simple adjustment for both caster and camber of wheel 2. As seen best in FIG. 2, assembly 12 includes a ball portion 20 and a stud portion 22 integral therewith. Ball portion 20 is disposed in a socket 24 formed in the upper end 26 of knuckle assembly 4. Formed integrally on stud portion 22 vertically adjacent ball portion 20 is a flange 28, the upper surface of which is formed with a frusto-spherical socket 30 which is adapted to receive an annular collar 32 having a cooperating frusto-spherical lower surface 34. Collar 32 is formed with a vertically extending cylindrical bore 36 which extends completely therethrough. At its upper end, collar 32 is formed with a pilot portion 38 having a tapered outer periphery 40 which is arranged eccentrically with respect to the axis of bore 36 and is received in complementary tapered opening 42 extending upwardly partially through the outer support portion 44 of upper control arm 10. A second tapered opening 46 is axially aligned with and merges with opening 42. Opening 46 forms a seat for a second collar 48 having a depending pilot portion 50 with a tapered outer periphery 52 arranged eccentrically with respect to the axis of the vertical bore 54 extending through the center of the collar. Bores 36 and 54 are of corresponding diameter and are dimensioned to provide radial bearing engagement with vertically spaced radial ribs 56 and 58 formed on the stem portion 60 of stud 22 extending therethrough. Each rib has a periphery of curved cross section, the purpose of which will be described shortly. Stud 22, collars 32 and 48, and support 44 are retained in assembled relation by means of a nut 62 which threadably engages the upper threaded end 64 of stem 60 and cooperates with flange 28 to urge collars 32 and 48 into clamping engagement with support 44.

As previously described, the axes of the respective bores 36 and 54 of collars 32 and 48 are eccentric with respect to the outer tapered periphery of their associated pilot portions 38 and 50. Accordingly, caster and camber of wheel 2 may be adjusted to any desired setting within a predetermined range by either concurrent or independent rotation of collars 32 and 48, such rotational adjustment being accomplished, for example, by a spanner wrench adapted to engage transverse notches 66 formed in collars 32 and 48 (FIG. 4). It will be understood, however, that numerous other means of effecting engagement may be employed; for example, the peripheral edge portions 68 and 70 of the collars may be shaped to provide square shoulders engageable by a conventional open end wrench.

Of primary importance in the present invention is the fact that the geometric center of the ball portion 20 may be adjusted to any desired point within a predetermined circular area (FIG. 3), the size of which is a function of the degree of eccentricity of collars 32 and 48 and the length of stud 22 between support 44 and the center 74 of the ball. In this respect, the present invention differs entirely from all previously known types of eccentric adjustment for ball joint assemblies. In order that the nature of the improvement may be more clearly understood, a brief description of operation of the invention follows together with a comparison with the form of adjustment attainable with eccentric adjustments of the prior art.

In FIG. 3, the assembly is shown arranged so that the geometric center of the ball 20 is displaced to its maximum limit in one direction. It will be seen that the collars 32 and 48 are rotated respectively so that the associated bores 36 and 54 are displaced the maximum amount in opposite directions. This relationship requires that the stem portion 60 of stud 22 assume a pronounced angle relative to the axis of both bores. However, owing to the radius of curvature of the periphery of each rib, bearing engagement between the stem and ring members 32 and 48 is nevertheless maintained. Referring again to FIG. 3, it will be evident that if ring members 32 and 48 are rotated simultaneously after the illustrated relationship has been established, the center 74 of ball portion 20 will describe a path similar to the periphery of the circular area 72. However, the center of ball 20 may also be adjusted to a position anywhere within the circular area, either by maintaining one of the ring members in a fixed position while rotating the other, or alternatively, by rotating the respective ring members in opposite directions. It necessarily follows, therefore, that the present invention permits absolutely independent adjustment of caster and camber, if desired. By contrast, devices of the prior art without exception are incapable of affording either caster or camber adjustment without a concurrent change in the other adjustment, whether desired or not.

In practice, utilization of the present invention is ideally accomplished assembling the suspension completely except that nut 62 is backed off sufficiently to permit free rotation of collars 32 and 48. The assembly is then disposed in a fixture which positively positions the wheel 2 in the desired attitude. While the wheel is in the fixtured position, ring members 32 and 48 are rotated manually until seated completely in their respective tapered seats 42 and 46 after which nut 62 is drawn up tightly.

While but one embodiment of the invention has been shown and described, it will be apparent that other changes and modifications may be made. It is, therefore, to be understood that it is not intended to limit the invention to the embodiment shown, but only by the scope of the claims which follow.

I claim:

1. In combination with a support having an aperture formed therein, a ball joint assembly comprising a ball portion and an integral stud portion extending through said aperture, a pair of annular collars disposed in opposed relation on said support, each collar having a bore surrounding said stud, a pilot portion on each collar seated in said support aperture, the axis of each bore being eccentric with respect to the associated pilot portion, convex bearing portions formed on each collar, a flange formed on said stud adjacent said ball, means forming a concave seat on said flange engageable with the convex bearing portion of one of said collars, and a nut threadably engaging the end of said stud portion, said nut having a concave seat engaging the convex bearing portion of the other collar.

2. The structure set forth in claim 1 wherein the diameter of the bore in each collar is greater than the diameter of said stud and the latter is provided with axially spaced radial ribs having peripheral edge portions of semi-circular cross section effecting bearing engagement with said bores.

References Cited in the file of this patent

UNITED STATES PATENTS

| | | |
|---|---|---|
| 1,689,750 | Redfield | Oct. 30, 1928 |
| 2,455,343 | Slack et al. | Nov. 30, 1948 |
| 2,470,693 | Finke et al. | May 17, 1949 |
| 2,544,331 | Kogstrom | Mar. 6, 1951 |
| 2,900,196 | Nienke | Aug. 18, 1959 |